US008960381B2

(12) United States Patent
Plantan et al.

(10) Patent No.: US 8,960,381 B2
(45) Date of Patent: *Feb. 24, 2015

(54) DISC BRAKE PAD MOUNTING AND RETENTION SYSTEM AND METHOD

(71) Applicant: Bendix Spicer Foundation Brake LLC, Elyria, OH (US)

(72) Inventors: Ronald Plantan, Mooresville, NC (US); Harish Radhakrishnan, Westlake, OH (US); Dennis Wolf, Westlake, OH (US); Will Roberts, Elyria, OH (US); Steven Bell, Amherst, OH (US); Richard Lantz, Clinton, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,372

(22) Filed: Oct. 2, 2013

(65) Prior Publication Data

US 2014/0048362 A1 Feb. 20, 2014

Related U.S. Application Data

(63) Continuation-in-part of application No. 13/588,500, filed on Aug. 17, 2012.

(51) Int. Cl.
*F16D 55/00* (2006.01)
*F16D 65/092* (2006.01)

(52) U.S. Cl.
CPC .................................. *F16D 65/092* (2013.01)
USPC .................. 188/73.32; 188/73.31; 188/250 B

(58) Field of Classification Search
USPC .......... 188/73.32, 73.31, 73.38, 73.39, 250 B
See application file for complete search history.

(56) References Cited

U.S. PATENT DOCUMENTS

| 3,357,524 | A | 12/1967 | Smith |
| 3,920,104 | A | 11/1975 | Hoffman |
| 3,990,545 | A | 11/1976 | Hoffmann et al. |

(Continued)

FOREIGN PATENT DOCUMENTS

| DE | 40 32 886 A1 | 4/1992 |
| EP | 0 357 469 A1 | 3/1990 |
| GB | 842913 | 7/1960 |

OTHER PUBLICATIONS

European Search Report dated Nov. 26, 2013 (Six (6) pages).

*Primary Examiner* — Thomas J Williams
*Assistant Examiner* — Mariano Sy
(74) *Attorney, Agent, or Firm* — Crowell & Moring LLP

(57) ABSTRACT

A system and method are provided for mounting, removing and retaining brake pads in disc brakes, such as air-operated disc brakes utilized on commercial vehicles, in a manner which does not require the use of separate brake pad retaining devices while providing positive retention of the brake pad. A preferred embodiment includes a brake caliper mount having brake pad abutment surfaces having radially-oriented and lateral grooves which permit a brake pad with corresponding projections on is lateral sides to be inserted through an opening of the brake caliper into the radially-oriented grooves until the backing plate projections are aligned with the lateral groove, and advancing the brake actuator behind the brake pad to place the brake pad in an operating position in which the actuator prevents the brake pad from realigning with the radially-oriented grooves until the actuator is retracted to permit brake pad extraction.

14 Claims, 7 Drawing Sheets

(56) References Cited

U.S. PATENT DOCUMENTS

| | | |
|---|---|---|
| 4,046,232 A | 9/1977 | Kellogg |
| 4,139,082 A | 2/1979 | Edwards |
| D255,232 S | 6/1980 | Rinker et al. |
| 4,371,060 A | 2/1983 | Iwata |
| 4,473,137 A | 9/1984 | Gerard et al. |
| 4,606,438 A | 8/1986 | Mathias |
| 4,611,693 A | 9/1986 | Wang |
| 4,936,422 A | 6/1990 | Mery et al. |
| 5,564,532 A | 10/1996 | Baba et al. |
| 5,875,873 A | 3/1999 | Kay et al. |
| 6,386,335 B1 | 5/2002 | DiPonio |
| 6,511,135 B2 | 1/2003 | Ballinger et al. |
| D490,350 S | 5/2004 | Blaschke et al. |
| D507,773 S | 7/2005 | Ono |
| 7,152,717 B2 | 12/2006 | Lelievre et al. |
| 7,201,257 B2 | 4/2007 | Nakajima et al. |
| 7,299,903 B2 | 11/2007 | Rockwell et al. |
| 7,458,447 B2 | 12/2008 | Thomas et al. |
| 7,475,759 B1 | 1/2009 | Sherman, II |
| 7,513,340 B2 | 4/2009 | Hendrich et al. |
| 7,578,374 B2 | 8/2009 | Takeo et al. |
| 7,604,098 B2 | 10/2009 | Dessouki et al. |
| 7,644,809 B2 | 1/2010 | Cortinovis et al. |
| 7,810,617 B2 | 10/2010 | Vanouche et al. |
| 7,926,631 B2 | 4/2011 | Roberts et al. |
| 8,205,726 B2 | 6/2012 | Schorn et al. |
| 8,540,061 B1 * | 9/2013 | Plantan et al. .......... 188/73.32 |
| 8,544,614 B1 * | 10/2013 | Plantan et al. .......... 188/73.32 |
| 2004/0016610 A1 | 1/2004 | Morris |
| 2004/0168868 A1 | 9/2004 | Thomas |
| 2008/0067015 A1 | 3/2008 | Thomas et al. |
| 2009/0008193 A1 | 1/2009 | Sekiya et al. |
| 2009/0277729 A1 | 11/2009 | Kim |
| 2012/0043168 A1 | 2/2012 | Narayanan, V et al. |
| 2012/0085597 A1 | 4/2012 | Narayanan, V |

* cited by examiner

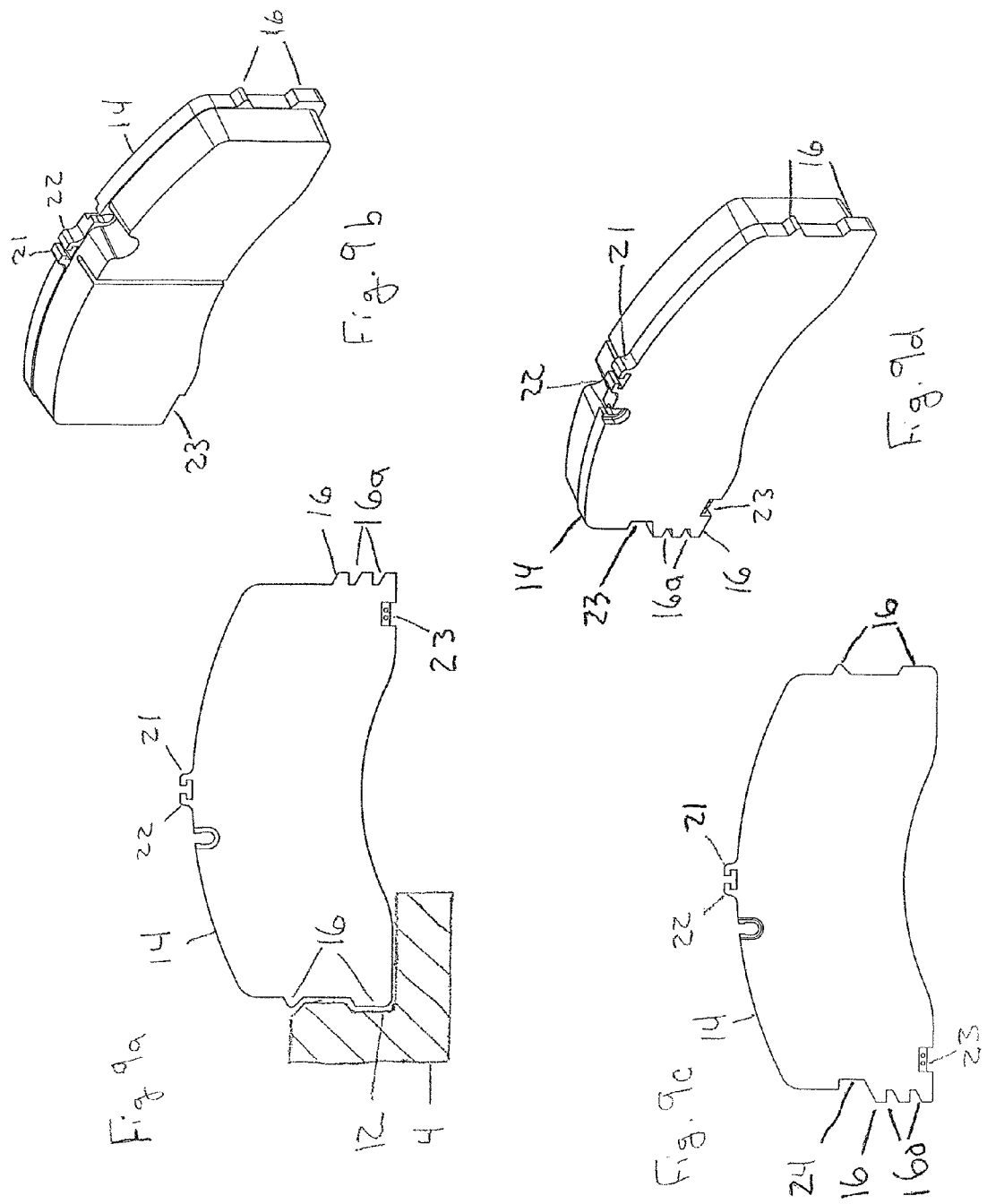

DISC BRAKE PAD MOUNTING AND RETENTION SYSTEM AND METHOD

BACKGROUND AND SUMMARY OF THE INVENTION

The present invention relates to disc brakes for vehicles, and in particular to a system and method for mounting, removing and retaining brake pads in disc brakes, such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1, and in particular FIG. 1 of this document, discloses an example of such an air disc brake. In this design, a pneumatic diaphragm chamber (pneumatic actuator) is attached to a rear face of the disc brake caliper housing, and applies a brake actuation force through a linear actuator rod to a brake actuator lever within the caliper. The brake's actuator lever in turn transfers and multiplies the force applied by the actuator rod to one or more spindles, which force brake pads against a brake disc or rotor. The terms "brake disc," "rotor" and "brake rotor" are used interchangeably herein.

As shown in FIG. 1 of DE 40 32 886 A1, the actuator is located inboard of the brake caliper, in large part because commercial vehicle wheel rims are sized to only provide adequate clearance for the drum-type brakes historically employed on such vehicles. Because the resulting space envelope between the wheel and its axle is limited, the actuator must be located into the space adjacent to the wheel. For the same reason, brake pads must be configured to conform to the limited available radial space, and thus have typically been located and retained on one of the brake caliper or brake caliper carrier/mount using transverse suspension pins and/or using leaf spring-type metal strips disposed over the outer radius of the brake pads. Brake pads have also been retained by capturing the brake pads between the caliper mounting frame and the portion of the brake caliper which straddles the brake disk. (As one of ordinary skill will recognize, the same brake pad support function may be provided by a brake caliper carrier/mount designed to support the brake pads or by a brake pad carrier which is separate from the caliper mounting structure. For convenience in this description, the terms caliper carrier, caliper mount and brake pad carrier may be interchanged without intending to limit the brake par supporting structure to any specific brake pad and brake caliper carrying structure.)

Conventional commercial vehicle air disc brakes have typically required the installation of ancillary brake pad retention mechanisms, and/or use of the brake caliper itself to retain the brake pads during service. Both of these approaches, and in particular use of the brake caliper as the retention means, requires disassembly of the pad retention mechanism and/or removal of the brake caliper in order to replace worn brake pads and install new brake pads. As a result, brake pad replacement in previous air-operated disc brake designs has been a labor-intensive, and therefore costly, process.

A further problem with prior art brake pads is the tendency for the brake pad to rotate and/or vibrate during brake operation. As illustrated in FIG. 6, when a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated for clarity). Specifically, at the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifesting itself as a moderate-to-severe oscillation of the brake pad in its mount, significantly increasing wear of the abutting brake pad and mount surfaces.

In order to prevent undesired rotation and/or vibration of the brake pad within its mounting (for example, rotation about the brake application direction), the brake pad backing plate and the adjacent mounting bracket horns supporting the brake pads in the circumferential direction required a relatively tall radial height to minimize the amount of brake pad rotation before a corner of the backing plate contacted the adjacent mount horn (a motion referred to as "pad kick" or "pad turnout"). This relatively tall structure in turn would require the brake caliper, which is installed over the brake pads and mounting bracket, to have its corresponding opposing inner surfaces radially outboard of the mount horns be relieved enough to accommodate the outer corners of the brake pad and/or mount horns. A problem with this thinning is that because the maximum outer radius of the brake caliper is typically constrained by very tight clearance to the inside of the adjacent wheel rim, the brake caliper arms straddling the brake disc between the application side and the reaction side of the caliper may end up being thinner than desired in this region in order to accommodate both the tall carrier mount horn and the close-fitting wheel rim. This can lead to very high tensile and bending stresses in the thin region, and an undesired reduction in fatigue life and service life.

The present invention addresses these and other problems by providing a brake pad mounting and retention arrangement and method of installation and removal which provides greater ease in in-situ brake pad installation and removal, without brake caliper removal or other significant brake disassembly work. This solution is of particular significant in highly space-constrained commercial vehicle air disc brake applications, where brake pad servicing without significant brake disassembly work caliper was not previously believed to be commercially practical.

In one embodiment of the present invention the brake caliper mount pad support horns are provided with a narrow vertical groove or slot on the side of the horns facing away from the brake disk. This groove is arranged to permit the brake pad, having features of corresponding thickness one its lateral sides, to slide in the radially-inward direction down the groove, until the brake pad reaches the installed position. The horns further have lateral grooves at or near their bases extending parallel to the brake disc rotation axis, arranged to receive the side features of the brake pad, such that the brake pad may advance toward the brake disk when pushed forward by the brake caliper's actuator. During service, the brake pad is positively retained in the brake by the combination of: (i) the lateral grooves in the mount horns, preventing lifting of the brake pad out of the caliper and undue rotation of the brake pad (i.e., twisting or "tipping" of the pad in the caliper as the rotating brake disk attempts to raise one end of the brake pad while pushing down on the other end of the brake pad); (ii) the brake disk, which prevents the brake pad from advancing so far as to emerge from the mount horn lateral grooves; and (iii) by the brake application device, which prevents the brake pad from retreating so far as to reach the mount horn vertical grooves and slide out the top of the caliper.

This arrangement also facilitates easy and rapid brake pad changes, as all that is required to remove the brake pads after wheel removal is to fully withdraw the brake application device, slide the brake pad backing plate axially to reach the mount horn vertical groove, and then simply lift the brake pad out of an opening in the top of the still-installed brake caliper. A new brake pad may then be inserted into the vertical groove until the backing plate's lateral features are aligned with the lateral grooves, followed by advancing the brake application device a sufficient distance behind the brake pad to prevent its backing out of the lateral grooves.

The present invention also provides the ability to significantly lower the height of the mount horns, thereby permitting the brake caliper thickness in high-stress regions to be made thicker to increase strength and caliper service life. The geometry of the relatively compact grooves and corresponding engaging features on the brake pad backing plates ensures the amount of brake pad rotation within the carrier is significantly limited as compared to prior art arrangements. Accordingly, because there is no longer a need to provide relatively tall mount horns to limit pad rotation (as the grooves now limit pad rotation), the horns may be made shorter. With the reduction in horn height, the newly-found additional clearance between the horn and the inner surface of the brake caliper in the regions over the horns allows the caliper to be made thicker in these highly-loaded areas. The addition of caliper material in these regions provides additional load-bearing cross-sectional area, with corresponding reduction in local stress levels and increase in caliper fatigue life.

Preferably the brake pad, mount and/or brake caliper may be provided with vibration-damping features, such as spring-loaded brackets on the backing plate lateral extensions or a spring member engaging tabs on the upper surface of the backing plate and on the caliper or caliper mount.

Other objects, advantages and novel features of the present invention will become apparent from the following detailed description of the invention when considered in conjunction with the accompanying drawings.

BRIEF DESCRIPTION OF THE DRAWINGS

FIGS. 9a-9d are elevation and oblique views of alternative embodiments of a brake pad with asymmetrical pad retention features.

DETAILED DESCRIPTION OF THE DRAWINGS

Figure 1:
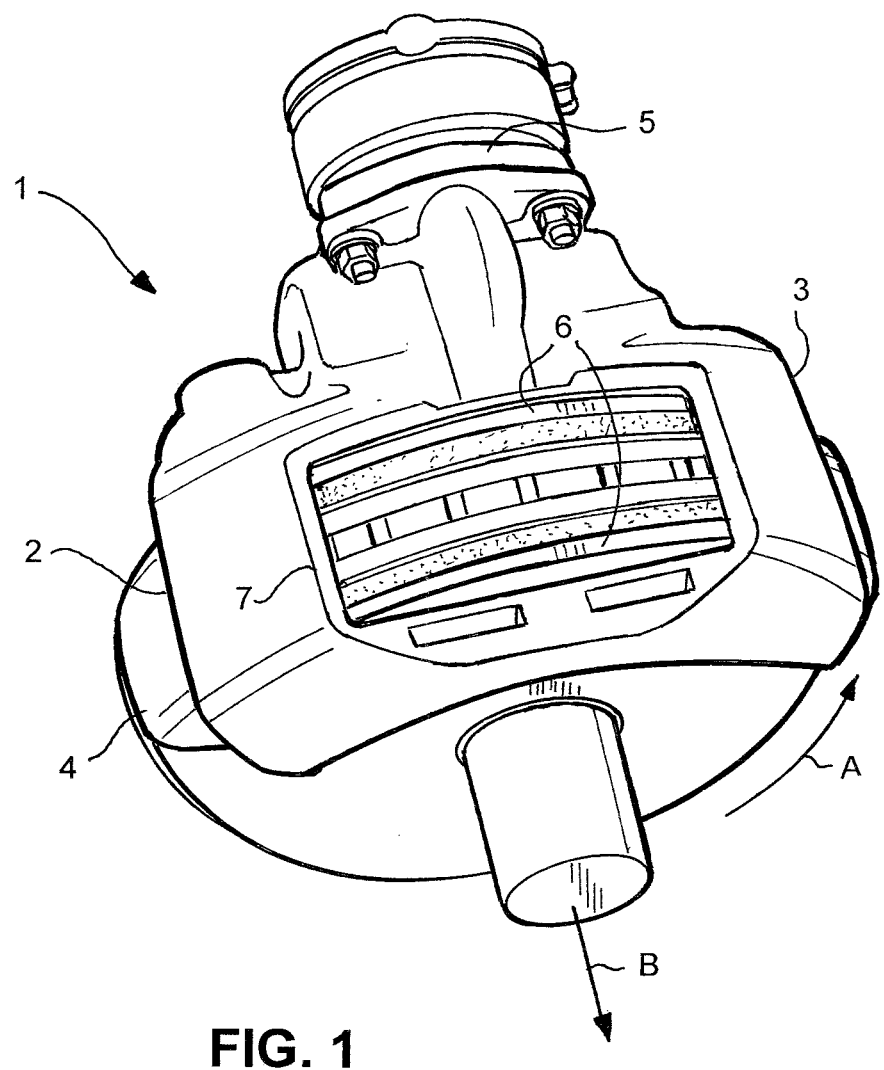
FIG. 1 is an oblique view of a disc brake in accordance with an embodiment of the present invention.

In the embodiment shown FIG. 1, a disc brake 1 of a commercial vehicle includes a brake disk 2, a brake caliper 3 straddling the brake disk 2. The caliper 3 is affixed to a caliper mounting carrier 4 which in turn is fixed to a vehicle axle, typically via a torque plate or a brake spider (not illustrated). The caliper 3 is actuated by an actuator 5, in this embodiment a spring brake actuator which is controlled by pneumatic pressure from the vehicle. The actuator 5 acts upon a brake pad application mechanism contained within caliper 3 to press brake pads 6 against the brake disk 2 to slow the vehicle. The present invention is not restricted to a pneumatic actuator (for example, an electrically-driven actuator may be used) or to a particular type of brake caliper/mount arrangement (for example, a fixed carrier and a sliding caliper with a single-side brake pad application mechanism, or a fixed carrier and fixed caliper with two-sided brake pad application mechanisms). In this embodiment the caliper 3 is provided with an aperture 7 which is wide enough in the circumferential direction A and the axial direction B to permit the brake pads 6 to be withdrawn and inserted without removal of the caliper 3 from the carrier mount 4.

Figure 2:
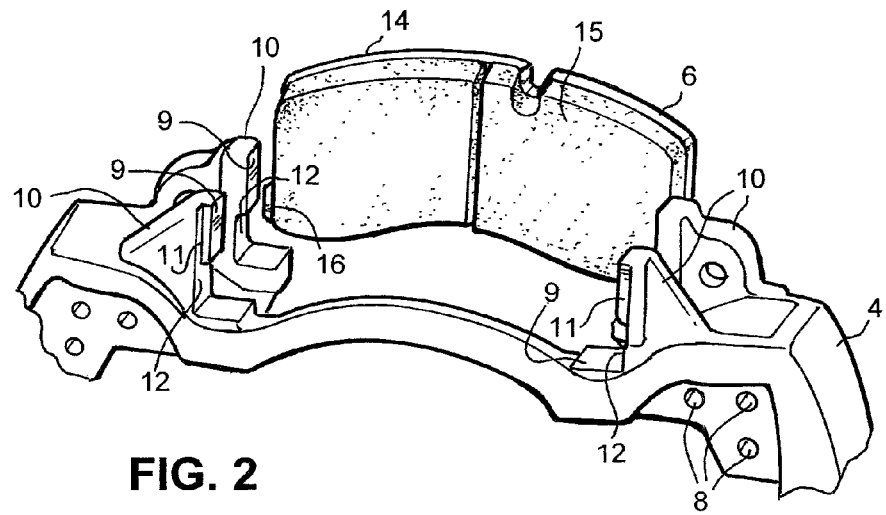
FIG. 2 is an oblique view of the caliper mounting carrier and brake pad of FIG. 1.
Figure 4A:
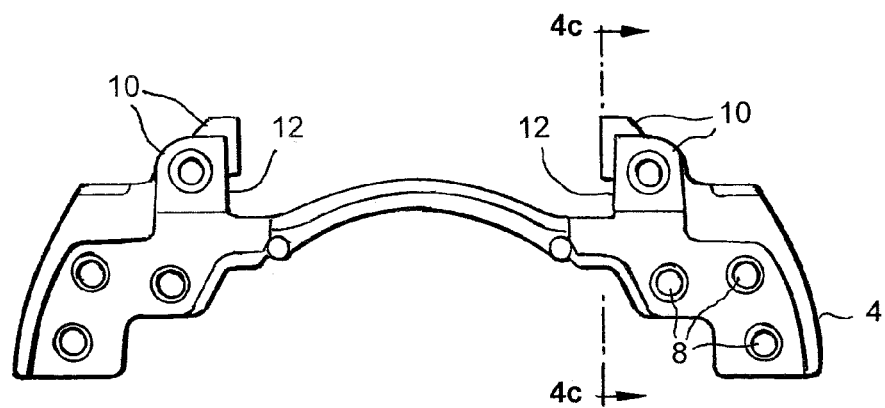
FIGS. 4a and 4b are elevation and front views, respectively, of the caliper mounting carrier of FIGS. 1 and 2.
Figure 4B:
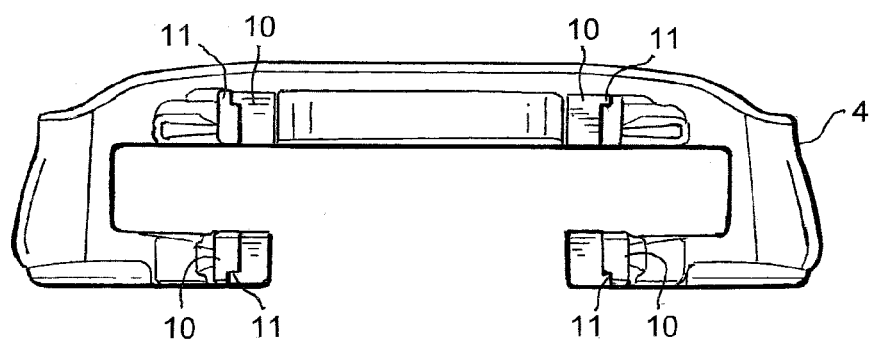
Figure 4C:
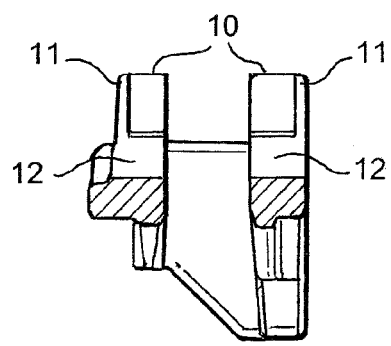
FIG. 4c is a cross-section view of the caliper mounting carrier of FIGS. 1 and 2 showing an embodiment of mount horn brake pad guiding and retaining grooves.

FIG. 2 shows an oblique view of the carrier and brake application-side brake pad of FIG. 1, with the brake disk 2, caliper 3, actuator 5 and opposing brake pad 6 removed for clarity. In this view and in FIGS. 4a-4c, there are illustrated the holes 8 in mount 4 for receiving caliper and axle mounting bolts, as well as the lateral brake pad engagement surfaces 9 on mount horns 10. It will be appreciated that the carrier need not be a caliper-supporting carrier, i.e., the caliper may be mounted on a component separate from the carrier, with only the brake pads being carried by the carrier.

Each of the mount horns 10 in this embodiment has a vertical brake pad installation/removal groove 11, and a horizontal brake pad guiding groove 12 at the bottom of each mount horn 10. It will be appreciated that the grooves or slots need not be located at the farthest axial locations on the carrier mount 4 away from the brake disk 2, or precisely at the bottom of the mount horns 10, as long as the brake pad 6 to be used in the brake is blocked from escape from the carrier mount 4 during in-service use and has pad retaining features with a vertical height corresponding to the height of the horizontal grooves 12. In an alternative embodiment, the vertical installation/removal groove 11 may be omitted, as long as sufficient space is provided in the caliper aperture in the direction of the brake disk rotation axis to permit the brake pad to be inserted radially inward into the brake, such that the retention features of the brake pad may reach and enter the horizontal grooves 12.

FIG. 2 and FIGS. 3a-3d show the brake pad 6, comprising a brake pad backing plate 14 and brake pad material 15 affixed to the brake disk side of the brake pad 6. The brake pad material 15 is arranged to fit between the mount horns 10 without engaging the grooves 11 or 12 to ensure free movement toward and away from the brake disk 2 and vertically in and out of the caliper during brake pad installation or removal. The brake pad 6 is also provided with pad retention features 16 at the lower corners of the lateral sides of the backing plate 14. In this embodiment the retaining features 16 are arranged as tab-like extensions of the backing plate 14. Preferably the tabs have a thickness in the brake application direction corresponding to the thickness of the backing plate 14, so that no special machining or other forming for width reduction are needed. In any event, whatever the thickness of the pad retaining features 16, the vertical grooves 11 must have an axial thickness and a circumferential width large enough to accommodate vertical passage of the pad retaining features 16 during insertion and removal of brake pad 6. Similarly, the lateral or axial grooves 12 must have a vertical height and a circumferential width large enough to accommodate horizontal passage of the pad retaining features 16 during in-service brake application and release and during movement away from the brake disk 2 during removal of brake pad 6. Preferably, the lateral grooves 12 are located toward the radially-inner portion of the caliper mount 4, where the carrier is more stiff.

In addition to the preferred arrangement with male pad retaining features extending laterally into female lateral receiving grooves, female slots in the lateral sides of the brake pad backing plate may be arranged to receive corresponding male projections from the caliper mount after the brake pad is inserted into the disc brake along the radially-oriented grooves. Alternatively, the female lateral receiving grooves may be placed directly on the caliper body, with or without corresponding features on the caliper mount. Additional example pad retention feature arrangements are discussed further, below.

Figure 3A:
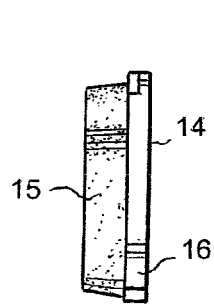
FIGS. 3a, 3b and 3c are side, front and top views, respectively, of the brake pad of FIGS. 1 and 2.
Figure 3B:
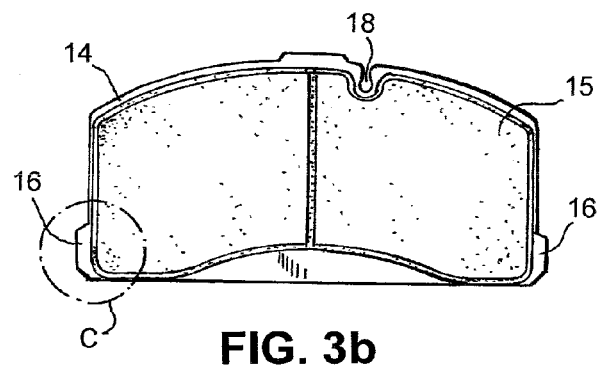
Figure 3C:
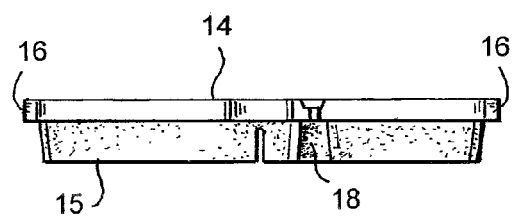

Also visible in FIGS. 3b and 3c is a groove 18 on the brake pad 6 for receiving a brake pad wear indication sensor (not illustrated).

Figure 3D:
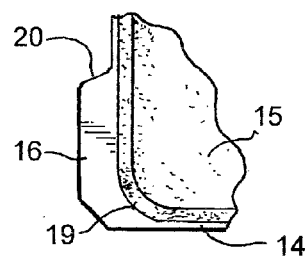
FIG. 3d is a detail view of an embodiment of a pad retention feature shown in FIG. 3b.

FIG. 3d shows a detailed view of the region of brake pad 6 highlighted in area C of FIG. 3b. In this region the brake pad retaining feature 16 is provided with a bevel, chamfer or rounded contour 19 at its lower edge to facilitate jam-free insertion and removal of the brake pad and to avoid developing a stress-concentrating contact point between the retaining feature 16 and the carrier mount 4 within groove 12. Preferably, a corresponding mating feature is provided on the carrier to reduce stress concentration. The pad retaining feature 16 is also provided with a bevel 20, preferably set at an angle corresponding to a similar angle at the top of horizontal groove 12. The upper bevel 20 is provided to present a larger bearing surface, and therefore lower contact pressures and stresses, as brake application forces are transferred from the brake pad 6 to the carrier mount 4 during brake application, a time when the brake disk 2 drives the brake pad 6 to rotate in the carrier mount 4. Inclusion of bevel 20 provides a planar surface to absorb forces over a broader contact area to minimize component wear, thereby preferably avoiding point or edge contact between the brake pad 6 and the carrier mount 4 which may occur with opposing rectilinear surfaces.

The angle of the bevel may be set to ensure that the contact pressure generated during maximum brake pad loading is below the yield strengths of the brake pad backing plate and the carrier mount materials. If the loads to be supported during brake application are relatively low, a shallow bevel angle on the order of 95-110 degrees may be sufficient to provide enough contact area on top of the bevel so that the stress level (force/area) is below the yield strength of the components. In the case of higher loadings or use of materials with lower yield strengths, a larger angle, on the order of 110-165 degrees may be required to provide a large enough contact area over which the load is distributed to remain below yield strength limits. An angle between 140-160 degrees, preferably 150 degrees, provides a large contact area while still minimizing the amount of pad "lift" or rotation during brake application.

A significant benefit of the pad retention arrangements of the present invention is evident in this embodiment. In the prior art, due to the need to maintain at least minimal clearances between the flat opposing faces of conventional straight-edged brake pads and their opposing mount horn abutment surfaces, the mount horns and brake pad mounting plate faces had to be relatively tall in order to minimize the extent to which the brake pad could rotate about the axial direction B when the brake was applied. With the current state of the art, due to the distance from the diagonally opposite corners of the brake pad, the typical tolerances between the brake pad backing plate and the mount horns would result a relatively large degree of undesirable pad rotation within the mount unless tall mount horns were provided to minimize the angular displacement of the brake pad. In the present invention, because the retaining features interact with the relatively small horizontal grooves 12, even with the same minimum brake pad/mount horn clearance requirements as in a conventional prior brake, the brake pad 6 cannot rotate nearly as far as a conventional brake pad before the upper surfaces of the pad retaining features 16 meet the top of horizontal groove 12 and halt the angular displacement of the brake pad 6.

For example, a typical prior art brake pad and retention arrangement would allow on the order of 4 mm of movement, leading to large displacement vibrations and accelerated wear of abutting surfaces of the pad backing plate and the mount horns. With the present invention, these movements may be reduced by 75% or more. Experiments with sample configurations have demonstrated movements being limited to as little as 0.75 mm. As a consequence, because pad rotation management has been transferred from the top edges of the mount horns to the horizontal grooves 12, the mount horns do not need to be as tall as previously known in order to control brake pad rotation to a desired extent. This in turn permits avoidance of undesired thinning of the brake caliper in the regions above the tops of the mount horns, thereby allowing these very highly loaded and stressed regions to have a greater cross-sectional area to absorb these loads. The lower stresses directly correspond to increase caliper strength and increased caliper fatigue life, despite the very constrained wheel rim environment of a commercial vehicle. The improvement in stress-bearing volume of material may also enable replacement of costly specialty alloys used to obtain sufficient strength in the thin sections of the caliper with common cast iron, significantly reducing material and production costs. It should be noted that although the amount of "pad kick" may be lower in the present invention, when the bevel angles of the brake pad retention features and the corresponding lateral grooves are selected, the angles may differ slightly to accommodate the pad rotation under braking, e.g., the pad retention feature angle may be slightly more obtuse than the mount's lateral groove bevel, so that when the pad rotates in the mount, the contact faces make contact across a planar area, rather than alone a single line of contact.

A further advantage of the present invention is that it permits the elimination of retaining leaf spring interlocking features on the top of the brake pad backing plate, as well as associated structures radially above the brake pads to receive and retain the leaf springs (e.g., a pad hold down bar), thereby increasing radial clearance above the brake pad and potentially permitting either a decrease in the greatest radial extent of the caliper within the wheel envelope, or increase in the diameter of the brake disk and pad height to increase the size of the brake swept area where the brake pad material interacts with the brake disk surface.

Figure 5:
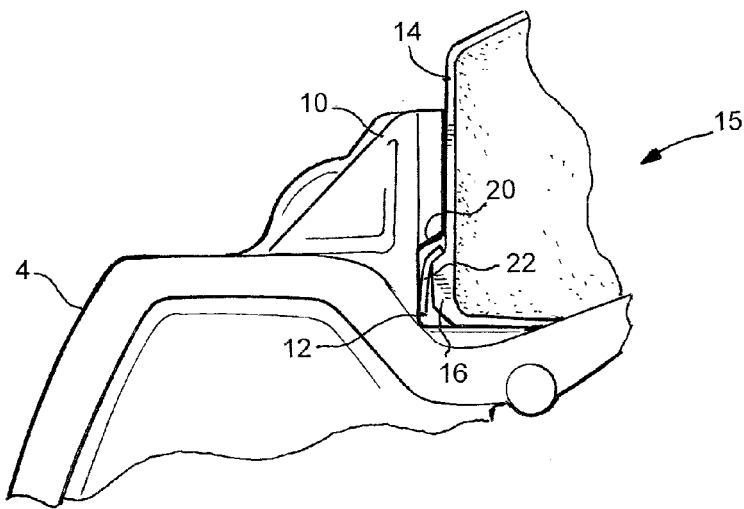
FIG. 5 is a detailed view of a pad retention feature including a pre-loading device in accordance with an embodiment of the present invention.
Figure 6:
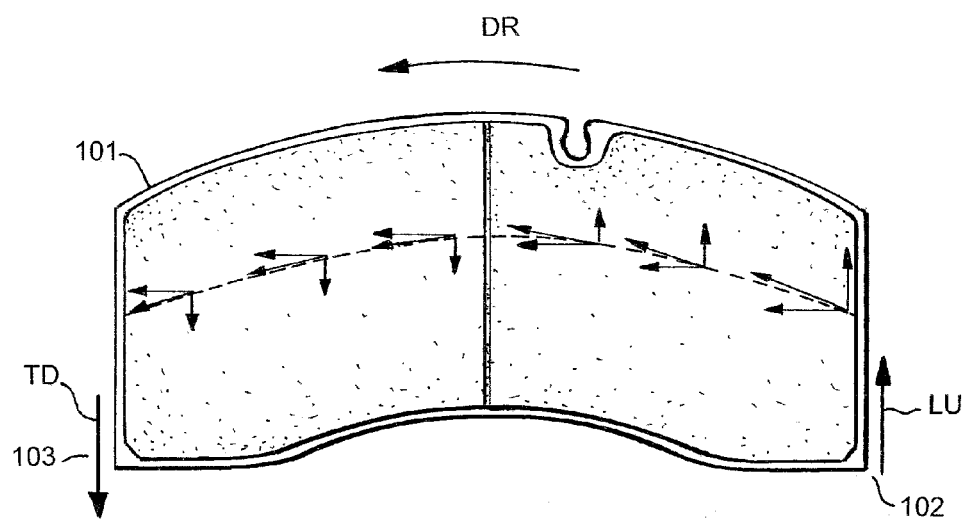
FIG. 6 is a schematic view of motions and forces resulting from application of a brake pad to a rotating brake disk.

The present invention's pad retaining features may also be provided with spring elements at or near the pad retaining features to desirably pre-load or dampen the pad relative to the mount, to reduce pad motion and reduce vibrations which may induce undesired noise and component wear during brake application. FIG. 5 shows a detailed view of an example arrangement, wherein a spring element 22 is located between the brake pad backing plate 14's pad retaining feature 16 and the outer wall of lateral groove 12. Such a pre-loading element may be affixed to either the mount 4 or the brake pad backing plate 14, for example by riveting or clipped on, or may be a separate element inserted between the mount 4 and the backing plate 14 when the pad 6 is inserted into the brake. Alternatively, the pre-loading element may have any of a number of suitable arrangements, such as a hinged member provided with a spring element which biases the hinged member laterally outward to engage the opposing surface.

Figure 7A:
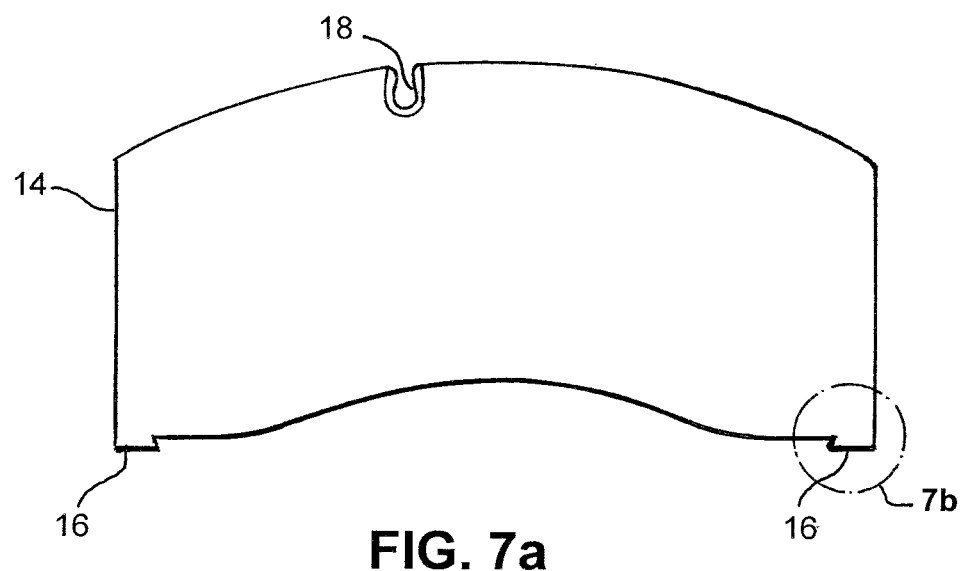
FIGS. 7a and 7b are views of an alternative embodiment of a brake pad with pad retention features at a lower surface of the brake pad.
Figure 7B:
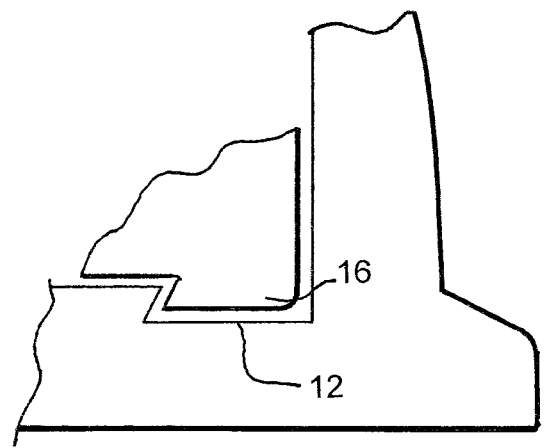

A further embodiment of the present invention is illustrated in FIGS. 7a-7b. In this embodiment, the pad retention is achieved with tabs 16 located on a lower edge or surface of the brake pad backing plate 14, with an undercut groove on at least one lateral side of the tab which engages a corresponding undercut groove in horizontal receiving groove 12. In this embodiment groove 12 is machined into the lower surface of caliper mount adjacent to the vertical pad abutment 10, rather than laterally across the face of the abutment. As with the foregoing example embodiments, this bottom-tab embodiment is inserted vertically (i.e., radially inward) along the outsides of the abutments 10, then advanced into engagement with grooves 12 toward the brake disk to positively retain the brake pad.

Figure 8A:
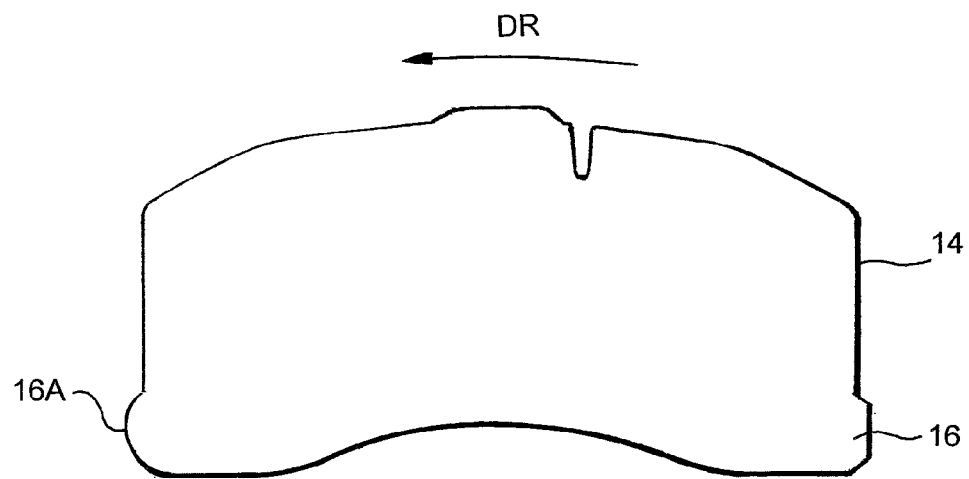
FIGS. 8a and 8b are views of an alternative embodiment of a brake pad with asymmetrical and rotation-accommodating pad retention features.
Figure 8B:
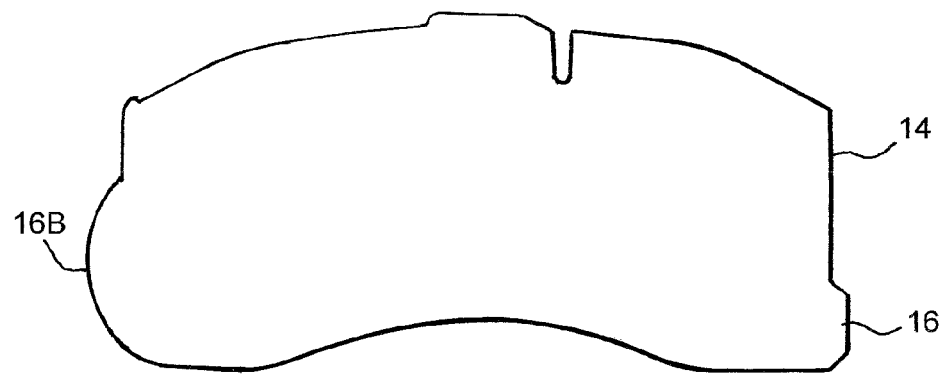

FIGS. 8a and 8b illustrate another embodiment of the present invention, in which the pad retention features are asymmetrical, and are also configured to accommodate the brake disk-induced brake pad rotation with minimal pad movement and minimum pad and abutment surface wear. FIG. 8a shows a brake pad backing plate 14 with a beveled tab 16 on the leading edge side of the brake pad, and a curved tab 16A on the trailing edge side of the brake pad. This configuration provides a number of further advantages, including a configuration which inherently prevents the brake pads from being installed on the wrong sides of the brake disk due to the incompatibility of the corresponding grooves 12 in which they slide. The curved surface also forms a "ball-and-socket"- or "cylinder-and-socket"-like bearing arrangement with its corresponding groove 12, thereby providing a broad surface area for contact between the brake pad tab 16A and groove 12 which lowers contact face stresses and resulting component wear. The curved surface may also further reduce the amount of brake pad motion ("pad kick") by more tightly limiting the range of motion of the trailing edge of the brake pad, with the curved tab 16A potentially acting as a nearly fixed point of rotation about which the leading edge tab 16 rotates. This nearly-fixed trailing edge configuration, acting essentially as a pivot, also provides additional resistance against brake pad motion becoming so great as to induce large-amplitude vibrations.

As shown in FIG. 8b, the trailing edge tab 16B may be a large radius curve, further spreading reaction force loads over a broader contact area. The curvature of the trailing edge tab is not limited to curves of constant radius. For example, the curves may be configured with decreasing or increasing radii, for example, to further define the motion of the trailing edge of the brake pad during brake application. Alternatively the curves maybe polygonal in shape. As with all of the embodiments of the present invention, these shapes may be economically formed, for example by lateral machining of the grooves 12 across the faces of the mount abutment surfaces with suitable tooling.

As with the previous embodiments, it may be preferable to account for pad rotation under braking in the brake pad backing plate design and/or the mount arrangements. For example, where the curved retention feature is on the trailing edge of the brake pad, in order to accommodate the "lift" of the leading edge of the brake pad during brake application (due to the leading edge's retention feature taking up the clearance in its lateral groove as its beveled surface meets the beveled top of the lateral groove) it may be desirable to provide a very corresponding very small relief or taper angle on the straight portion of the trailing edge of the brake pad. Preferably the amount of clearance in the leading edge lateral groove is maintained large enough to ensure free pad movement toward/away from the brake disc during all operating conditions, but small enough that when the pad rotates about the curved retaining feature on the trailing edge the backing plate only rotates on the order of three degrees or less (i.e., the trailing edge relief angle would be less than approximately 10 degrees, and preferably would be maintained at three degrees or less, very preferably approximately one degree).

FIGS. 9a-9d illustrate additional alternative embodiments of a brake pad with asymmetrical pad retention features. FIG. 9a is an elevation view, and FIG. 9b is an oblique view of the opposite face of, a brake pad backing plate 14. This brake pad backing plate 14 has alternative tab configurations and locations which provide brake pad rotation control while conforming to the present invention's approach to brake pad mounting and retention. These embodiments also include an optional feature on the upper edge of the brake pad backing plate 14, a brake pad installation and removal feature formed between opposing flanges 21, 22. This feature may receive a tool or other component which provides a way to hold and slide the brake pad during installation and removal. This installation and removal feature is not necessary for the functioning of the present invention.

The illustrated brake pad also includes a vibration-suppression feature 23 on a lower portion of the brake pad backing plate 14, in this embodiment in the form of a slot for receiving an anti-vibration element such as an anti-rattle spring positioned between the brake pad backing plate 14's lower edge and the pad carrier mount beneath the brake pad. As shown in the figures, the vibration-damping feature 23 may include surfaces on which the anti-vibration element may be fixed to permit the anti-vibration element to be self-retaining on the brake pad.

On a first lateral side of the brake pad (in FIG. 9a, the left side of the figure) there are upper and lower tabs 16. The lower tab 16 has a shape generally corresponding to the tabs 16 shown in FIGS. 3a-3d, and an upper tab 16 has the form of a beveled projection. Each of these tabs 16 are configured to engage corresponding horizontal receiving grooves 12 in the brake pad carrier, or in the case of the upper tab 16, to abut a face of the brake pad carrier 4 (the latter arrangement being shown in FIG. 9, where the upper tab 16 projection abuts a face of the schematically-illustrated mount 4). The upper tab 16 is provided to further enhance stability of the brake pad backing plate 14 during braking events by providing an abutment surface spaced from the lower tab 16. The additional contact surface between this upper tab of the brake pad backing plate 14 and the corresponding groove 12 or face of the brake pad carrier is intended to distribute loads over a greater contact area and thereby lower localized stress levels.

On the opposite lateral side of the brake pad backing plate 14 in FIGS. 9a and 9b, a lower tab 16 is configured with multiple grooves or serrations 16a. This arrangement provides a tab having the advantages of the previous embodiments, and further provides multiple contact surfaces between the tab and the corresponding groove 12 in the brake pad carrier over which the braking reactions forces may be dispersed, thereby lowering local stress levels in the contact regions.

FIGS. 9c and 9d illustrate a variation on the embodiment in FIGS. 9a and 9b, in which a groove 24 is located in the region above the serrated tab 16. The groove 24 provides installation clearance.

It should understood that the upper tab 16 and/or groove 24 and/or the serrated tab grooves arrangements may be used with any of the foregoing embodiments, that the number of lateral tab projections is not limited to only two tabs, and that there is no requirement that the number or configuration of tabs on both lateral sides of the brake pad be symmetrical.

A time- and labor-saving method of installation of brake pads in a new brake embodiment of the present invention would include a first step of sliding the as-yet pad-less brake caliper axially outward to position the brake for receipt of the outboard brake pad. A second step would involve inserting radially inwardly the outboard brake pad until the brake pad's lateral retention features are aligned with the lateral receiving features in the outboard side of the brake pad carrier. A third step would involve sliding the caliper in the axially inward direction to both advance the outboard brake pad into engagement with the carrier's outboard side pad receiving features, and to position the caliper for receiving the inboard brake pad. A fourth step would involve inserting radially inwardly the inboard brake pad until the brake pad's lateral retention features are aligned with the lateral receiving features in the inboard side of the brake pad carrier. A fifth step would involve advancing the brake application and/or adjusting mechanisms in the brake application direction to both advance the inboard brake pad into engagement with the carrier's inboard side pad receiving features, and to position the caliper for brake operation. The thickness of the brake pad retention features and the arrangements of the corresponding receiving features must be such that sufficient brake pad retention engagement is always ensured, even when the brake pad and the brake rotor are new, i.e., at their maximum thicknesses before use.

In the case of replacing brake pads in, for example, an in-service brake in which brake pads are already installed, the foregoing brake pad loading method would be prefaced with a corresponding brake pad removal operation, in which: the brake application and/or adjustment mechanisms are withdrawn far enough to permit the inboard brake pad to be moved away from the brake disk to reach the brake pad removal position, the inboard brake pad would be extracted radially outward through the caliper aperture, the caliper would be moved in the radially outward direction far enough to permit the outboard brake pad to be moved away from the brake disk to reach its brake pad removal position, and the outboard brake pad would be extracted radially outward through the caliper aperture.

The foregoing disclosure has been set forth merely to illustrate the invention and is not intended to be limiting. For example, rather than machining vertical and lateral grooves 11, 12 in the mounting horns 10, a replaceable pad abutment surface may be provided on the carrier mount 4, with a width and height corresponding to the geometry of the retaining features on the brake pad backing plate 14. As another example, more than one pad retaining feature and corresponding receiving feature on the caliper may be provided on each of the lateral sides of the brake pad, and/or the features may be provided at different heights. Because other such modifications of the disclosed embodiments incorporating the spirit and substance of the invention may occur to persons skilled in the art, the invention should be construed to include everything within the scope of the appended claims and equivalents thereof.

What is claimed is:

1. A brake pad for a disc brake having a brake caliper configured to receive a brake pad in a radial direction through an opening that straddles a brake disc, the brake pad comprising:
   a brake pad backing plate having at least one brake pad retaining feature on each lateral side of the backing plate; and
   a brake pad lining material affixed to a brake disc-side of the brake pad backing plate,
   wherein
      each of the lateral brake pad retaining features has a vertical height extending in a direction between top and bottom edges of the brake pad backing plate, a lateral width extending in a circumferential direction of the brake pad backing plate and a thickness extending in a direction parallel to a rotation axis of the brake disc when the brake pad is in an installed position,
      the width and the thickness of each of the lateral brake pad retaining features are dimensioned to allow the brake pad to be inserted radially through the brake caliper opening into a radially-oriented brake pad insertion feature of the disc brake adjacent to a side of the caliper opening furthest away from the brake disc,
      the height, the width and the thickness of each of the lateral brake pad retaining features are dimensioned to allow the brake pad, following radial insertion through the brake caliper opening, to be advanced toward the brake disc and engage into at least one lateral brake pad receiving feature of the disc brake,
      at least one brake pad retaining feature of the at least one brake pad retaining feature on each lateral side of the backing plate is a lateral projection configured to engage a correspondingly-configured groove of the corresponding radially-oriented brake pad insertion feature and a correspondingly-configured groove of the corresponding lateral brake pad receiving feature, and
      at least one brake pad retaining feature of the at least one lateral brake pad retaining features, on at least one of the lateral sides, includes at least one groove extending in the direction parallel to the rotation axis of the brake disc when the brake pad is in an installed position, the at least one groove being configured to engage a correspondingly-configured projection of the corresponding lateral brake pad receiving feature.

2. The brake pad of claim 1, wherein on at least one of the lateral sides of the brake pad backing plate, at least one brake pad retaining feature of said at least one lateral brake pad retaining features includes at least two lateral projections spaced apart from one another.

3. The brake pad of claim 2, wherein at least one of the at least two lateral side brake pad retaining features includes a radially outer surface arranged at a non-perpendicular angle to at least one lateral side of the brake pad.

4. The brake pad of claim 3, wherein the non-perpendicular angle is an obtuse angle.

5. The brake pad of claim 4, wherein the obtuse angle is between 95-165 degrees.

6. The brake pad of claim 5, wherein the obtuse angle is between 140-160 degrees.

7. The brake pad of claim 6, wherein the obtuse angle is 150 degrees.

8. The brake pad of claim 4, wherein the radially outer surface arranged at the non-perpendicular angle is on the at least one lateral brake pad retaining feature that includes the at least one groove extending in the direction parallel to the rotation axis of the brake disc.

9. The brake pad of claim 3, wherein the radially outer surface arranged at a non-perpendicular angle is configured such that, when in an installed position in the disc brake, the radially outer surface contacts a corresponding surface of the corresponding lateral brake pad receiving feature across at least a two-dimensional surface area portion of the radially outer surface arranged at the non-perpendicular angle.

10. The brake pad of claim 9, wherein the at least two-dimensional surface area portion is a two-dimensional planar surface.

11. The brake pad of claim 9, wherein
the at least two-dimensional surface area portion is a three-dimensional curved surface.

12. The brake pad of claim 11, wherein
the three-dimensional curved surface has a cylindrical profile with an axis of rotation parallel with the rotation axis of the brake disc.

13. A brake pad for a disc brake having a brake caliper configured to receive a brake pad in a radial direction through an opening that straddles a brake disc, the brake pad comprising:
a brake pad backing plate having at least one brake pad retaining feature on each lateral side of the backing plate; and
a brake pad lining material affixed to a brake disc-side of the brake pad backing plate,
wherein
each of the lateral brake pad retaining features has a vertical height extending in a direction between top and bottom edges of the brake pad backing plate, a lateral width extending in a circumferential direction of the brake pad backing plate and a thickness extending in a direction parallel to a rotation axis of the brake disc when the brake pad is in an installed position,
the width and the thickness of each of the lateral brake pad retaining features are dimensioned to allow the brake pad to be inserted radially through the brake caliper opening into a radially-oriented brake pad insertion feature of the disc brake adjacent to a side of the caliper opening furthest away from the brake disc,
the height, the width and the thickness of each of the lateral brake pad retaining features are dimensioned to allow the brake pad, following radial insertion through the brake caliper opening, to be advanced toward the brake disc and engage into at least one lateral brake pad receiving feature of the disc brake,
the at least one brake pad retaining feature on each lateral side is a lateral projection configured to engage a correspondingly-configured groove of the corresponding radially-oriented brake pad insertion feature and a correspondingly-configured groove of the corresponding lateral brake pad receiving feature, and
on at least one of the lateral sides of the brake pad backing plate, the at least one brake pad retaining feature includes at least two lateral projections spaced apart from one another.

14. The brake pad of claim 13, wherein at least one of the at least two lateral projections includes at least one groove extending in the direction parallel to the rotation axis of the brake disc when the brake pad is in an installed position configured to engage a correspondingly-configured projection of the corresponding radially-oriented brake pad insertion feature and a correspondingly-configured projection of the corresponding lateral brake pad receiving feature.

* * * * *